(12) United States Patent
Galimberti et al.

(10) Patent No.: US 11,479,634 B2
(45) Date of Patent: Oct. 25, 2022

(54) POLYMER COMPRISING REPEATING UNITS CONSISTING OF A SUBSTITUTED PYRROLE RING AND PRODUCTS OBTAINED BY COMBINING SAID POLYMERS WITH CARBON ALLOTROPES

(71) Applicant: POLITECNICO DI MILANO, Milan (IT)

(72) Inventors: Maurizio Stefano Galimberti, Milan (IT); Vincenzina Barbera, Biancavilla (IT); Ada Truscello, Merate (IT); Roberto Sebastiano, Lazzate (IT); Antonio Marco Valerio, Sesto S. Giovanni (IT)

(73) Assignee: POLITECNICO DI MILANO, Milan (IT)

( * ) Notice: Subject to any disclaimer, the term of this patent is extended or adjusted under 35 U.S.C. 154(b) by 438 days.

(21) Appl. No.: 15/500,266

(22) PCT Filed: Aug. 11, 2015

(86) PCT No.: PCT/EP2015/068490
§ 371 (c)(1),
(2) Date: Jan. 30, 2017

(87) PCT Pub. No.: WO2016/023915
PCT Pub. Date: Feb. 18, 2016

(65) Prior Publication Data
US 2017/0226269 A1 Aug. 10, 2017

(51) Int. Cl.
| | |
|---|---|
| *C08G 18/32* | (2006.01) |
| *C08G 61/12* | (2006.01) |
| *C08G 63/133* | (2006.01) |
| *C08G 64/02* | (2006.01) |
| *C08G 65/34* | (2006.01) |
| *C08G 18/38* | (2006.01) |
| *C08G 18/73* | (2006.01) |
| *C08G 63/685* | (2006.01) |
| *C08K 3/04* | (2006.01) |
| *C08G 18/80* | (2006.01) |
| *C08G 18/50* | (2006.01) |
| *C08G 18/46* | (2006.01) |
| *C08G 18/44* | (2006.01) |

(52) U.S. Cl.
CPC ......... *C08G 18/3844* (2013.01); *C08G 18/44* (2013.01); *C08G 18/4646* (2013.01); *C08G 18/5057* (2013.01); *C08G 18/73* (2013.01); *C08G 18/8012* (2013.01); *C08G 18/8058* (2013.01); *C08G 61/124* (2013.01); *C08G 63/6856* (2013.01); *C08G 64/0241* (2013.01); *C08G 65/34* (2013.01); *C08K 3/04* (2013.01); *C08K 3/041* (2017.05); *C08K 3/042* (2017.05); *C08G 2261/3221* (2013.01); *C08G 2261/43* (2013.01); *C08G 2650/50* (2013.01); *C08G 2650/56* (2013.01)

(58) Field of Classification Search
CPC ................ C08G 18/10; C08G 18/3215; C08G 18/3844; C08G 18/44; C08G 18/4646; C08G 18/5057; C08G 18/73; C08G 18/8012; C08G 18/8058; C08G 61/124; C08G 61/6856; C08G 64/0241; C08G 65/34; C08G 2261/3221; C08G 2261/43; C08G 2650/50; C08G 2650/56
See application file for complete search history.

(56) References Cited

U.S. PATENT DOCUMENTS

2006/0155092 A1* 7/2006 Harasin .................. C08G 18/10
528/44

OTHER PUBLICATIONS

Maeda et al.; Macromolecules, 1995, vol. 28, No. 8, p. 2905-2911.*
Azioune et al.; Langmuir, 2004, vol. 2, p. 3350-3356.*
Lalaoui et al.; Chemical Communications, 2013, vol. 13, p. 9281-9283.*
Broadbent et al.; Journal of Heterocyclic Chemistry, 1976, vol. 13, issue 337.*

* cited by examiner

*Primary Examiner* — Robert S Jones, Jr.
(74) *Attorney, Agent, or Firm* — Scott D. Swanson; Shaver & Swanson, LLP

(57) ABSTRACT

The present invention relates to a polymer comprising repeating units consisting of a substituted pyrrole ring. In particular, the repeating units consist of substituted pyrrole containing polar groups capable of interacting with carbon allotropes such as carbon nanotubes, graphene or nanographites, in order to improve the chemical-physical characteristics of the allotropes mainly by increasing their dispersibility and stability in liquid media and in polymer matrices. The invention also relates to products of addition of these polymers with carbon allotropes in order to obtain easily dispersible macromolecules.

7 Claims, 2 Drawing Sheets

POLYMER COMPRISING REPEATING UNITS CONSISTING OF A SUBSTITUTED PYRROLE RING AND PRODUCTS OBTAINED BY COMBINING SAID POLYMERS WITH CARBON ALLOTROPES

The present invention relates to a polymer comprising repeating units consisting of a substituted pyrrole ring. The invention also relates to products obtained by combining said polymers with carbon allotropes.

In particular, the invention relates to polymers comprising repeating units consisting of substituted pyrrole containing polar groups capable of interacting with carbon allotropes such as carbon nanotubes, graphene or nanographites for the purpose of improving the chemical-physical characteristics of said allotropes, mainly by increasing their dispersibility and stability in liquid media and polymer matrices.

One of the research topics of greatest interest in the field of polymers at present concerns the preparation of innovative macromolecular structures from renewable sources. Qualifying objectives of this activity include: using raw materials that do not have an impact on the food chain; adopting processes of synthesis that have a low environmental impact, both from the energy standpoint and because they do not involve solvents and do not give rise to chemical waste substances; and producing polymers that do not pose disposal problems after their use.

Among the raw materials from renewable sources, glycerol is of particular interest because it has no impact on the food chain, and it is non-toxic, biodegradable, and readily available at low cost. In fact, glycerol is the main byproduct of the synthesis of biodiesel. In 2011, 65% of glycerol was obtained by this means, and the total quantity available on the market amounted to approximately 1.2 million tons. Glycerol is considered the main "building block" for the development of an alternative $C_3$ platform to the one derived from oil. Glycerol is not often used for the preparation of polymers, however, because it has some drawbacks: it is highly viscous and very hydrophilic, and it contains three hydroxyl groups of similar reactivity that make the synthesis of linear polymer chains difficult.

Carbon allotropes, such as carbon nanotubes, graphene and nanographites, have exceptional mechanical properties and electrical and thermal conductivity. In particular, they have the capacity to conduct electrons without dissipating energy in the form of heat. They also have nanometric dimensions: one dimension in the case of graphene; and two in the case of nanotubes. This assures them a large surface area and the consequent capacity to establish a large area at the interface with the matrix containing them, thus considerably influencing its properties. Thanks to their properties, carbon allotropes such as carbon nanotubes, graphene and nanographites are used both in polymer, plastic and elastomer matrices, and in coatings. In the case of polymer matrices, they can be blended directly in said matrices to form the end product by means of traditional mixing technologies, or they can be contained in predispersed products, typically in higher concentrations than those used in the end product. Carbon allotropes such as carbon nanotubes, graphene and nanographites in polymer matrices also have a marked flame-retarding effect. Similarly, in the case of dispersions in liquid media, carbon allotropes such as carbon nanotubes, graphene and nanographites can be part of the final formulation for use in the preparation of coatings, for instance, or they can be contained in a "mother solution" for use in the preparation of various formulations.

In the case of polymer composite materials that contain carbon allotropes, efforts are being made to obtain an optimal distribution and dispersion of the allotrope, and above all to ensure an optimal interaction of the allotropes with the matrix that remains stable in the material's conditions of use. In the case of dispersions in liquid media, the primary aim is to make the dispersion stable. It is important to avoid any separation of the allotrope. In fact, the main problem encountered in the case of polymer composite materials containing carbon allotropes is an inadequate interaction of the allotropes with the polymer matrix. This leads to an insufficient transfer of the allotropes' properties to the composite, leading to an unstable dispersion of the allotropes involved, which tend to form clumps, with a considerable negative fallout on the properties of the end material. The greatest problem encountered in the case of carbon allotrope dispersions in liquid media lies in the fact that these dispersions are not stable enough to be used in industry because the carbon allotropes tend to sediment.

To achieve the goal of a stable dispersion of carbon allotropes in both liquid media and polymer matrices, the allotropes are functionalized by means of covalent chemical modifications. This leads to a change in the chemical nature of the allotropes, however, with a reduction, or even loss of their key properties. In fact, carbon allotropes all feature the same the carbon atom hybridization. In fact, the carbon is $sp^2$ hybridized and there are cycles as a base unit in each carbon allotrope. These cycles may have 5 or 6 carbon atoms, each of which is involved in the formation of three sigma bonds and one $\pi$ perpendicular to the plane on which the sigma bonds lie. The electrons involved in the molecular orbital $\pi$ are all continuously delocalized on the aromatic polycyclic system. This can happen because the cycles are all condensed and constitute a single system. Graphite, graphene and carbon nanotubes form the equivalent of an aromatic polycondensed system with a different degree of planarity. Three conditions must be met for a system to be defined as aromatic. First of all, the system must be cyclic. Then the atoms involved in the cycle must all have $sp^2$ hybridization, and the sum of the electrons $\pi$ must satisfy Huckel's rule ($\pi=4n+2$, where n is an integer, including zero). Finally, the system must be planar. These requirements are all met in the case of graphite and graphene. In the case of carbon nanotubes, the curvature influences the condition of planarity. The system can nonetheless be defined as aromatic; in fact, it represents an exception. The $sp^2$ hybridization lies behind the properties of carbon allotropes, starting from their electrical and thermal conductivity. The covalent modification of these allotropes leads to a modification of the $sp^2$ nature of the carbon atoms, and to the consequent loss of these properties to some degree. Examples of the covalent modification of a carbon allotrope, such as the carbon nanotube, are provided in the following articles published in the scientific literature: "Chemistry of carbon nanotubes", *Chem. Rev.* (2006), 106(3), 1105-36; "Organic functionalization and characterization of single-walled carbon nanotubes", *Chem. Soc. Rev.*, p. 2214-2230, 2009; "Current progress on the chemical modification of carbon nanotubes," *Chem. Rev.*, p. 5366-5397, 2010. A particular example of a covalent modification of a carbon allotrope involves the introduction of oxygenated groups such as hydroxyls, carboxyls, epoxies, and anhydrides. The modification of a nanographite is described in "Chemically reduced graphite oxide with improved shape anisotropy", *J. Phys. Chem.* C 116 (2012) 24809-24813; and in "Nanocomposites of poly(1,4-cis-isoprene) with graphite oxide intercalation compounds", *Macromol. Chem. Phys.* 214 (17)

(2013) 1931-1939. A large number of oxygenated groups can be introduced, more than 700 meq/100 g of allotrope. The carbon atoms' hybridization is clearly modified.

To achieve the goal of a stable dispersion of carbon allotropes in both liquid media and polymer matrices, the allotropes are also functionalized by means of chemical modifications of non-covalent type, or in other words by means of supramolecular interactions. There is a description of supramolecular modifications made to carbon nanotubes in "Current progress on the chemical modification of carbon nanotubes," *Chem. Rev.*, p. 5366-5397, 2010. One effective supramolecular interaction is called stacking, i.e. arranging aromatic molecules one on top of the other. The molecule used to establish the supramolecular interaction with the carbon allotrope must therefore contain one or more aromatic rings, because molecules containing aromatic rings tend to spontaneously pile on top of one another. Hence the concept of aromatic interaction (or π-π interaction), which means a bond of non-covalent type that is established between organic compounds containing aromatic groups because of the intermolecular overlap of the p orbitals in the π-conjugated systems. This type of interaction makes the bond much more stable, because it increases the number of electrons π. In the article "Mechanical reinforcement of polybenzoxazole by carbon nanotubes through noncovalent functionalization," *Macromolecules*, pp. 4034-4040, 2013, multiwalled carbon nanotubes were modified with a precursor of a poly(benzoxazole), enabling the carbon nanotubes to be dispersed in organic solvents such as dimethyl acetamide, then heated to obtain a film composed of the nanotube/poly(benzoxazole)adduct. In the article "Supramolecular interactions of high molecular weight poly(2,7-carbazole)s with single-walled carbon nanotubes," *Macromolecules*, p. 3850-3860, 2013, stable, concentrated dispersions of poly(2,7-carbazole) and carbon nanotubes were prepared using tetrahydrofuran and toluene as solvents. In the article "Composites of functional poly(phenylacetylene)s and single-walled carbon nanotubes: preparation, dispersion, and near-infrared photoresponsive properties," *Macromolecules*, p. 8479-8487, 2013, single-walled carbon nanotubes were dispersed in the same solvents thanks to the use of poly(phenylacetylenes) with long alkyl chains as lateral substituents. In the polymers described in the three above-mentioned examples, there is an aromatic ring in each repeating unit. The carbon nanotubes modified with these polymers can only be dispersed in organic solvents, which are mainly aromatic and the majority of them have a critical environmental impact. It is hard to imagine using these dispersions in the coating, paint and ink industry, without having to manage their environmental impact, and the use of water-based solvents is out of the question.

Chemical modifications of non-covalent type, or in other words by means of supramolecular interactions, can be achieved by avoiding the presence of aromatic ring and using functional groups containing π electrons instead. WO2010/102763 describes compositions based on a semi-crystalline polyurethane in which carbon nanotubes are dispersed to improve their characteristics. Clearly, the interaction between the polymer and the carbon nanotube is due to the carbonyl group contained in the polymer, so it cannot be considered a particularly stable interaction. In the absence of a stable interaction, the carbon nanotube dispersed in the polymer matrix, or in a liquid medium, tends to sediment and become separated from the medium, leading to some areas richer in nanotubes and others where the nanotubes are lacking, and consequently altering the characteristics of the product. In addition, the type of polymer—polyurethane—makes the adduct suitable for being dispersed in a polyurethane matrix, but not particularly suitable for other types of polymer matrix, or for dispersions in liquid media, starting from the water-based. The polyurethanes described in the invention are also not obtained from natural sources.

US2006/0045838 describes adducts between carbon nanotubes and soluble polymers selected from poly(thiophene), poly(pyrrole), poly(fluorene), poly(phenylene), poly(phenylene ethynylene), poly(phenylene vinylene), poly(alkylidene fluorene), poly(fluorene bithiophene), and combinations thereof. The nature of the polymers is clearly lipophilic, and this implies the choice of organic solvents to dissolve them, which pose crucial problems from the point of view of their impact on health and the environment, such as chloroform. These adducts do not allow for stable dispersions to be obtained in polar solvents with a low environmental impact, such as water-based solvents. In the absence of said stability, the dispersion of the nanotubes will become nonhomogeneous with the passage of time.

Supramolecular interaction is therefore preferable inasmuch as it does not modify the $sp^2$ nature of the carbon atoms, and the consequent properties of the carbon allotropes. The known state of the art shows, however, that the most stable supramolecular interaction can only be pursued with polymers containing such a large number of aromatic rings as to make the use of organic solvents unavoidable, and most of them have a critical environmental impact.

That carbon allotropes can be dispersed in water-based solvents is also common knowledge. Surfactants such as sodium dodecyl sulfate are used, as reported in "SDS surfactants on carbon nanotubes: aggregate morphology" *ACS Nano*, 2009, 3 (3), pp 595-602. In this case, the interaction between the dodecyl substituent and the allotrope can be exploited, while the salt guarantees dispersion in water. The article "Decoration of carbon nanotubes with chitosan" *Carbon*, 43(15), 3178-3180 (2005) demonstrates the dispersion of carbon nanotubes in acid solutions (pH=5), preparing the adduct of the carbon nanotubes with chitosan. In this case, the interaction between the ammonium cations and the π systems of the nanotubes is exploited. Clearly, these modifiers reduce the properties of the allotropes, contributing nothing at all to their electrical and thermal conductivity.

It is also well known that a polymer with an aromatic repeating unit can be dissolved in a water-based environment. For instance, a water-soluble polymer of a substituted pyrrole is obtained by means of the electro-oxidative polymerization of potassium 3-(3-alkylpyrrol-1-yl)propane sulfonates, as reported in "Lamellar conjugated polymers by electrochemical polymerization of heteroarene-containing surfactants: potassium 3-(3-alkylpyrrol-1-yl) propane-sulfonates" *Chem. Mater.* 1994, 6, 850-851.

A water-soluble polypyrrole is described in "A water-soluble and self-doped conducting polypyrrole graft copolymer", *Macromolecules* 2005, 38, 1044-1047. A poly(sodium styrene sulfonate-co-pyrrolyl methyl styrene) copolymer is used as a precursor for the polymerization of the pyrrole contained as a lateral group in the polymer with other unsubstituted pyrrole units.

These two examples necessitate the synthesis of a substituted pyrrole, or of a polymer containing a pyrrole ring. The yields of these reactions are not very high, and they are not conducted starting from ingredients obtained from renewable sources. Alternatively, the post-treatment of polypyrroles is described in "Synthesis and characterization of water-soluble polypyrrole doped with functional dopants" *Synthetic Metals* 143 289-294 (2004). In this case, a polypyrrole is sulfonated, but it is not possible to obtain a polymer containing aromatic rings like that of the pyrrole and polar groups directly by polymerization.

It would be desirable to be able to prepare stable dispersions of carbon allotropes both in liquid media and in polymer matrices, obtaining adducts of the carbon allotropes with polymers and oligomers that contain functional groups capable of interacting with the aromatic rings of the carbon allotropes, i.e. groups containing π electrons as aromatic rings, or carbonyls, or ammonium groups, or even only lipophilic groups, without interfering with the dispersibility of the adducts in matrices and polar solvents. In particular, it would be desirable to be able to use solvents with a low environmental impact such as alcohols, ethers, esters, and even water-based solvents.

It would be desirable to insert in the structure of the polymer both the functional group that promotes interaction with the carbon allotrope and other functional groups. In other words, it would be desirable to produce a variety of polymers starting from the "building block" that contains the functional group capable of interacting with the carbon allotrope.

It would also be desirable to be able to achieve a synergy between the functional groups capable of interacting with the carbon allotropes, for instance to enable aromatic rings and other functional groups containing π electrons, such as carbonyls, to be combined.

It would likewise be desirable for the modifiers to be in the form of a polymer, or at least an oligomer, thereby guaranteeing a repetition along a chain formed by covalent bonds of the functional group that promotes the interaction with the carbon allotrope, and facilitating a more stable interaction.

It would therefore be desirable to have a versatile building block available for the preparation of the polymer modifiers of the carbon allotropes, where with the adjective 'versatile' is used to mean the capacity to generate a stable interaction with the carbon allotrope by means of the formation of the polymer, and at the same time a stable interaction with polar media. In particular, it would be desirable for the building block to contain at least one aromatic ring and polar groups at the same time.

It would be desirable for the modifiers used in the preparation of the adducts not to reduce the properties of the carbon allotropes. In particular, it would be highly desirable for the modifiers to be able to contribute to their electrical conductivity.

It would also be desirable for the stable adducts of the polymers with the carbon allotropes to be easy to achieve. In particular, it would be desirable to be able to use straightforward polymerization methods. It would also be desirable to be able to use different polymerization methods.

It would be desirable for the polymer structures to enable stable dispersions of carbon allotropes to be obtained, in order to maintain their characteristics over time.

It would therefore be desirable for the stable dispersions of the allotropes in liquid media or in polymer matrices to be easy to achieve.

It would be desirable for the polymer structures capable of stably interacting with carbon allotropes such as nanotubes, graphene and nanographites to be produced starting from renewable sources, that preferably have no impact on the food chain, in order to achieve a low environmental impact, not only in energy terms for their preparation and because no solvents are used and no chemical waste products are generated, but also in terms of the disposal of the materials after their use.

One object of the present invention is thus to achieve polymer structures that are easy to obtain and produced starting from renewable and natural sources that have no impact on the food chain, in order to obtain materials with a low environmental impact both in energy terms relating to their preparation, and in terms of pollution due to their disposal.

Another object of the present invention is to achieve polymer structures capable of interacting with carbon allotropes in a stable and effective manner so as to obtain structures capable of enabling stable dispersions of the carbon allotropes in liquid media and in various types of polymer matrix such as rubbers or plastics.

Another object of the present invention is to achieve polymer structures capable of interacting with carbon allotropes in a stable and effective manner, and that do not negatively affect the feasibility of dispersing the carbon allotropes in polar solvents too, and even in water-based solvents.

A further object of the present invention is to achieve polymer structures capable of interacting stably and effectively with carbon allotropes and that can contribute to some degree to the carbon allotrope's properties, such as its electrical conductivity.

These and other objects of the present invention are achieved by means of a polymer comprising repeating units of formula

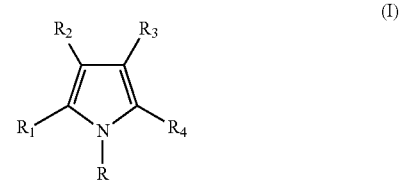

(I)

wherein:

if $R_1$, $R_2$, $R_3$, $R_4$ are independently selected from the group consisting of: hydrogen, $C_1$-$C_{22}$ alkyl, linear or branched $C_2$-$C_{22}$ alkenyl or alkynyl, aryl, $C_1$-$C_{22}$ alkyl-aryl, linear or branched $C_2$-$C_{22}$ alkenyl-aryl, $C_2$-$C_{22}$ alkynyl-aryl, heteroaryl;

then R is independently selected from the group consisting of:

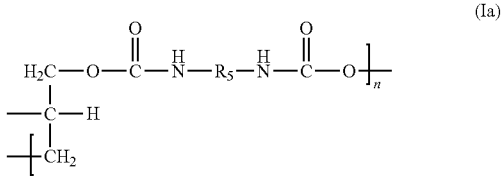

(Ia)

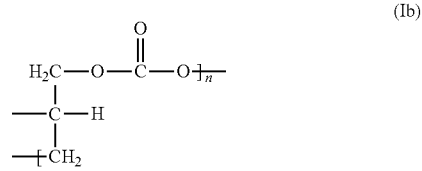

(Ib)

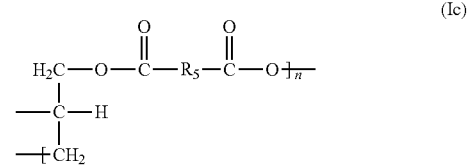

(Ic)

-continued

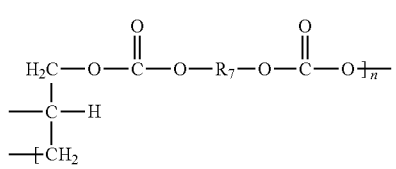
(Ic)

wherein R5, R6, R7 are selected from the group consisting of: a saturated or unsaturated, linear or branched $C_1$-$C_{22}$ hydrocarbon chain, an unsubstituted or substituted $C_5$-$C_6$ cyclic hydrocarbon chain, an aromatic group with no heteroatoms unsubstituted or substituted by one or more linear or branched $C_1$-$C_{22}$ hydrocarbon chains, an aromatic group containing from 1 to 3 heteroatoms unsubstituted or substituted by one or more saturated or unsaturated, linear or branched $C_1$-$C_{22}$ hydrocarbon chains, or R6 equals zero;

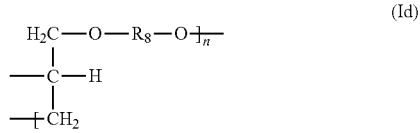
(Id)

wherein R8 is selected from: a saturated or unsaturated, linear or branched $C_1$-$C_{22}$ hydrocarbon chain, an unsubstituted or substituted $C_5$-$C_6$ cyclic hydrocarbon chain, an aromatic group with no heteroatoms unsubstituted or substituted by one or more saturated or unsaturated, linear or branched $C_1$-$C_{22}$ hydrocarbon chains, an aromatic group containing from 1 to 3 heteroatoms unsubstituted or substituted by one or more saturated or unsaturated, linear or branched $C_1$-$C_{22}$ hydrocarbon chains, or R8 is a compound of formula II

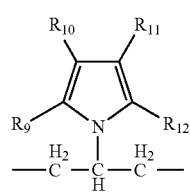
(II)

wherein R9, R10, R11, R12 are independently selected from the group consisting of: hydrogen, $C_1$-$C_{22}$ alkyl or linear or branched $C_2$-$C_{22}$ alkenyl or alkynyl, aryl, linear or branched $C_2$-$C_{22}$ alkyl-aryl, linear or branched $C_2$-$C_{22}$ alkenyl-aryl, linear or branched $C_2$-$C_{22}$ alkynyl-aryl, heteroaryl;

n is an integer from 1 to 1000;

with the condition that, in the repeating units of formula (I), if R is

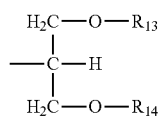

wherein R13 and R14 are independently selected from the group consisting of: hydrogen, $C_1$-$C_{22}$ alkyl, linear or branched $C_2$-$C_{22}$ alkenyl or alkynyl, aryl, linear or branched $C_2$-$C_{22}$ alkyl-aryl, linear or branched $C_2$-$C_{22}$ alkenyl-aryl, linear or branched $C_2$-$C_{22}$ alkynyl-aryl, heteroaryl;

or if R is

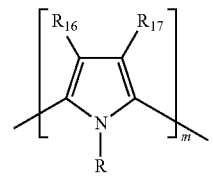

wherein R15 is independently selected from the group consisting of: a saturated or unsaturated, linear or branched $C_1$-$C_3$ hydrocarbon chain, a carbonyl group;

then R1 and R4 are

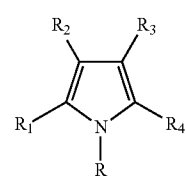

wherein R16, R17 are independently selected from the group consisting of: hydrogen, $C_1$-$C_3$ alkyl, linear or branched $C_2$-$C_{22}$ alkenyl or alkynyl, aryl, linear or branched $C_1$-$C_{22}$ alkyl-aryl, linear or branched $C_2$-$C_{22}$ alkenyl-aryl, linear or branched $C_2$-$C_{22}$ alkynyl-aryl, heteroaryl;

m is an integer from 1 to 1000.

The above formulas define a polymer capable of interacting in a stable and durable manner with carbon allotropes such as nanotubes and graphene, so as to obtain macromolecules that can be easily dispersed in more ample polymer matrices, in which the properties of the carbon allotropes can be preserved evenly throughout the matrix in which they are dispersed.

A polymer according to the present invention comprises repeating units of formula

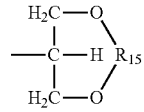
(I)

wherein R is

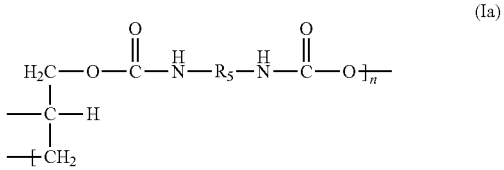
(Ia)

wherein R5 is selected from the group consisting of: a saturated or unsaturated, linear or branched $C_1$-$C_{22}$ hydrocarbon chain, an unsubstituted or substituted $C_5$-$C_6$ cyclic hydrocarbon chain, an aromatic group with no heteroatoms, unsubstituted or substituted by one or more linear or branched $C_1$-$C_{22}$ hydrocarbon chains, an aromatic group containing from 1 to 3 heteroatoms, unsubstituted or substituted by one or more saturated or unsaturated, linear or branched $C_1$-$C_{22}$ hydrocarbon chains, and $R_1$, $R_2$, $R_3$, $R_4$ are independently selected from the group consisting of: hydrogen, $C_1$-$C_{22}$ alkyl, linear or branched $C_2$-$C_{22}$ alkenyl or alkynyl, aryl, $C_1$-$C_{22}$ alkyl-aryl, linear or branched $C_2$-$C_{22}$ alkenyl-aryl, $C_2$-$C_{22}$ alkynyl-aryl, heteroaryl;

n is an integer from 1 to 1000.

The polymer thus obtained is a polyurethane containing repeating units comprising a substituted or unsubstituted pyrrole ring, capable of interacting stably with the carbon allotropes so as to form macromolecules capable of producing stable dispersions of said allotropes both in an aqueous environment and in other polymer matrices.

Another polymer according to the present invention comprises repeating units of formula

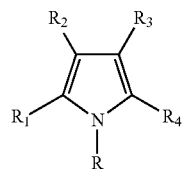

(I)

wherein R is

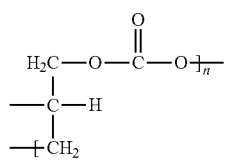

(Ib)

and $R_1$, $R_2$, $R_3$, $R_4$ are independently selected from the group consisting of: hydrogen, $C_1$-$C_{22}$ alkyl, linear or branched $C_2$-$C_{22}$ alkenyl or alkynyl, aryl, $C_1$-$C_{22}$ alkyl-aryl, linear or branched $C_2$-$C_{22}$ alkenyl-aryl, $C_2$-$C_{22}$ alkynyl-aryl, heteroaryl;

n is an integer from 1 to 1000.

The polymer thus obtained is polycarbonate, wherein the polymer sequence is characterized by a molar ratio of 1:1 between the pyrrole ring and the carbonate group, and it contains repeating units comprising a substituted or unsubstituted pyrrole ring capable of interacting stably with carbon allotropes so as to form macromolecules capable of producing stable dispersions of the allotrope both in an aqueous environment and in other polymer matrices.

A further polymer according to the present invention comprises repeating units of formula

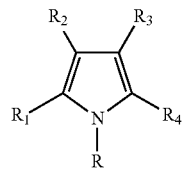

(I)

wherein R is

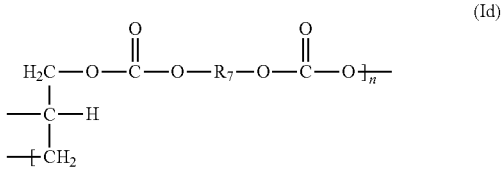

(Id)

wherein R7 is selected from the group consisting of: a saturated or unsaturated, linear or branched $C_1$-$C_{22}$ hydrocarbon chain, an unsubstituted or substituted $C_5$-$C_6$ cyclic hydrocarbon chain, an aromatic group with no heteroatoms, unsubstituted or substituted by one or more linear or branched $C_1$-$C_{22}$ hydrocarbon chains, an aromatic group containing from 1 to 3 heteroatoms, unsubstituted or substituted by one or more saturated or unsaturated, linear or branched $C_1$-$C_{22}$ hydrocarbon chains, and $R_1$, $R_2$, $R_3$, $R_4$ are independently selected from the group consisting of: hydrogen, $C_1$-$C_{22}$ alkyl, linear or branched $C_2$-$C_{22}$ alkenyl or alkynyl, aryl, $C_1$-$C_{22}$ alkyl-aryl, linear or branched $C_2$-$C_{22}$ alkenyl-aryl, $C_2$-$C_{22}$ alkynyl-aryl, heteroaryl;

n is an integer from 1 to 1000.

The polymer thus obtained is polycarbonate, wherein the polymer sequence is characterized by a molar ratio of 1:2 between the pyrrole ring and the carbonate group, and it contains repeating units comprising a substituted or unsubstituted pyrrole ring capable of interacting stably with carbon allotropes so as to form macromolecules capable of generating stable dispersions of the allotrope both in an aqueous environment and in other polymer matrices.

Another polymer according to the present invention comprises repeating units of formula

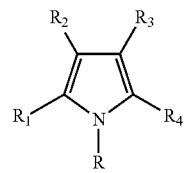

(I)

wherein R is

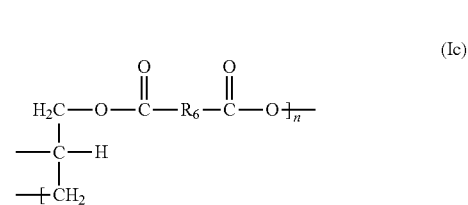

(Ic)

wherein R6 is selected from the group consisting of: a saturated or unsaturated, linear or branched $C_1$-$C_{22}$ hydrocarbon chain, an unsubstituted or substituted $C_5$-$C_6$ cyclic hydrocarbon chain, an aromatic group with no heteroatoms, unsubstituted or substituted by one or more linear or branched $C_1$-$C_{22}$ hydrocarbon chains, an aromatic group containing from 1 to 3 heteroatoms, unsubstituted or substituted by one or more saturated or unsaturated, linear or branched $C_1$-$C_{22}$ hydrocarbon chains; or R6 equals zero, and $R_1$, $R_2$, $R_3$, $R_4$ are independently selected from the group consisting of: hydrogen, $C_1$-$C_{22}$ alkyl, linear or branched $C_2$-$C_{22}$ alkenyl or alkynyl, aryl, $C_1$-$C_{22}$ alkyl-aryl, linear or branched $C_2$-$C_{22}$ alkenyl-aryl, $C_2$-$C_{22}$ alkynyl-aryl, heteroaryl;

n is an integer from 1 to 1000.

The polymer thus obtained is a polyester containing repeating units comprising a substituted or unsubstituted pyrrole ring capable of interacting stably with carbon allotropes so as to form macromolecules capable of producing stable dispersions of the allotrope both in an aqueous environment and in other polymer matrices.

Another polymer according to the present invention comprises repeating units of formula

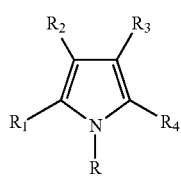

(I)

wherein R is

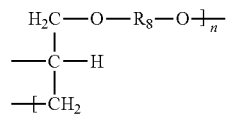

(Ie)

wherein R8 is selected from: a saturated or unsaturated, linear or branched $C_1$-$C_{22}$ hydrocarbon chain, an unsubstituted or substituted $C_5$-$C_6$ cyclic hydrocarbon chain, an aromatic group with no heteroatoms unsubstituted or substituted by one or more saturated or unsaturated, linear or branched $C_1$-$C_{22}$ hydrocarbon chains, an aromatic group containing from 1 to 3 heteroatoms, unsubstituted or substituted by one or more saturated or unsaturated, linear or branched $C_1$-$C_{22}$ hydrocarbon chains, or compounds of formula (II)

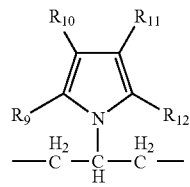

(II)

wherein R9, R10, R11, R12 are independently selected from the group consisting of: hydrogen, $C_1$-$C_{22}$ alkyl, or linear or branched $C_2$-$C_{22}$ alkenyl or alkynyl, aryl, linear or branched $C_2$-$C_{22}$ alkyl-aryl, linear or branched $C_2$-$C_{22}$ alkenyl-aryl, linear or branched $C_2$-$C_{22}$ alkynyl-aryl, heteroaryl;

and $R_1$, $R_2$, R1, $R_4$ are independently selected from the group consisting of: hydrogen, $C_1$-$C_{22}$ alkyl, linear or branched $C_2$-$C_{22}$ alkenyl or alkynyl, aryl, $C_1$-$C_{22}$ alkyl-aryl, linear or branched $C_2$-$C_{22}$ alkenyl-aryl, $C_2$-$C_{22}$ alkynyl-aryl, heteroaryl;

n is an integer from 1 to 1000.

The polymer that is obtained is a polyether containing repeating units comprising a substituted or unsubstituted pyrrole ring capable of interacting stably with carbon allotropes so as to form macromolecules capable of producing stable dispersions of said allotropes both in an aqueous environment and in other polymer matrices.

Another polymer according to the present invention comprises repeating units of formula

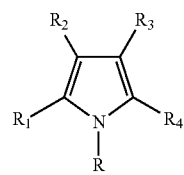

(I)

wherein R is

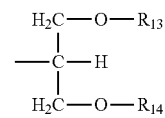

wherein R13 and R14 are independently selected from the group consisting of: hydrogen, $C_1$-$C_{22}$ alkyl, linear or branched $C_2$-$C_{22}$ alkenyl or alkynyl, aryl, linear or branched $C_2$-$C_{22}$ alkyl-aryl, linear or branched $C_2$-$C_{22}$ alkenyl-aryl, linear or branched $C_2$-$C_{22}$ alkynyl-aryl, heteroaryl;

or

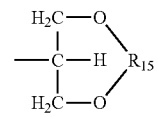

wherein R15 is independently selected from the group consisting of: a saturated or unsaturated, linear or branched $C_1$-$C_3$ hydrocarbon chain, a carbonyl group;

and R1 and R4 are

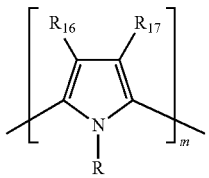

wherein R16, R17 are independently selected from the group consisting of: hydrogen, $C_1$-$C_3$ alkyl, linear or branched $C_2$-$C_{22}$ alkenyl or alkynyl, aryl, linear or branched $C_1$-$C_{22}$ alkyl-aryl, linear or branched $C_2$-$C_{22}$ alkenyl-aryl, linear or branched $C_2$-$C_{22}$ alkynyl-aryl, heteroaryl;

m is an integer from 1 to 1000.

The polymer thus obtained is a polypyrrole containing repeating units comprising a substituted or unsubstituted pyrrole ring capable of interacting stably with carbon allotropes so as to form macromolecules capable of producing stable dispersions of the allotropes both in an aqueous environment and in other polymer matrices.

It is therefore possible to obtain a vast range of polymers capable of interacting more or less stably with carbon allotropes. There is thus a vast range of macromolecules containing carbon allotropes available by means of which it is possible to obtain stable and durable aqueous dispersions and dispersions in other polymers.

A further object of the present invention is to achieve polymer adducts with carbon allotropes that are stable, obtained starting from natural raw materials and from renewable sources, and that consequently enable the characteristics of the allotropes to be exploited in both solid and liquid matrices.

These and other objects of the present invention are achieved by means of an adduct of a polymer according to the present invention as described previously and a carbon allotrope or derivatives thereof.

The adduct is thus a macromolecular compound containing carbon allotropes by means of which stable and durable aqueous dispersions and dispersions in other polymers can be obtained.

According to the present invention, the term 'carbon allotrope' is used to mean allotropes in which the carbon is $sp^2$ hybridized.

The carbon allotrope, or its derivative, of which the adduct according to the present invention is composed is preferably selected from the group consisting of: carbon black, fullerene, single-walled or multiwalled carbon nanotubes, graphene, or graphite with a number of graphene layers in the range of 2 to 10,000. In the present description, the term "carbon allotrope" is also used to mean derivatives of the allotrope and/or the allotrope functionalized in various ways.

The carbon allotrope or its derivatives are of which the adduct according to the present invention is composed preferably contains functional groups selected from those listed below:

oxygenated functional groups, and preferably hydroxyls, epoxy;

functional groups containing carbonyls, and preferably aldehydes, ketones, carboxylic acids;

functional groups containing nitrogen atoms, and preferably amines, amides, nitriles, imines;

functional groups containing sulfur atoms, and preferably sulfides, disulfides, mercaptans, sulfones, sulfinic and sulfonic groups.

The carbon allotrope or its derivative of which the adduct according to the present invention is composed is preferably graphite oxide.

The carbon allotrope or its derivative of which the adduct according to the present invention is composed is preferably graphene oxide.

The method for preparing polymers according to the present invention is described below, beginning with the synthesis of the starting monomers.

According to the present invention, the polymers described were obtained by synthesizing the starting monomer, starting from 2-amino-1,3-propanediol, which is known as serinol (formula III)

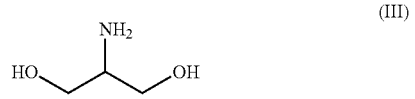

or from a substituted serinol of general formula

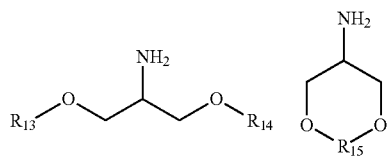

Serinol is commercially available, but can also be prepared from glycerol or from dihydroxyacetone, or it can be obtained directly from renewable sources, such as glycerol, dihydroxyacetone, or from dihydroxyacetone oxime, as explained in "Serinol: small molecule—big impact" AMB Express 2011, 1:12. The chemoselectivity of the aminic and hydroxylic functional groups enables the preparation of the multifunctional molecules needed to synthesize the polymers according to the present invention.

In order to obtain the starting monomer of interest, the serinol is made to react with a diketone of general formula

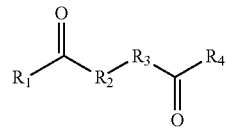

By way of example, the preparation of a serinol derivative used as a monomer to prepare polymers according to the present invention by means of polymerizations in steps or chain polymerizations, i.e. 2-(2,5-dimethyl-1H-pyrrol-1-yl)-1,3-propanediol, is described below (formula V).

The 2-(2,5-dimethyl-1H-pyrrol-1-yl)-1,3-propanediol is prepared by means of a two-step process as described below.

Equimolar quantities of 2-amino-1,3-propanediol and 2,5-hexanedione are made to react, obtaining the tricyclic compound 4a,6a-dimethyl-hexahydro-1,4-dioxo-6b-azacycle penta [cd] pentalene (formula IV)

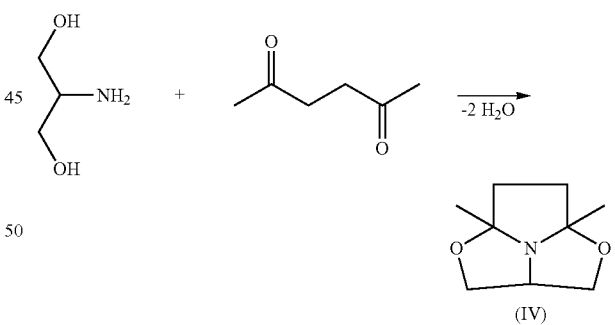

The compound of formula (IV) is synthesized by means of the Knorr-Paal reaction (L. Knorr, *Chem. Ber.*, vol. 18, page. 299 (1885); C. Paal, *Chem. Ber.*, vol. 18, page. 367 (1885); H. Smith Broadbent, *Journal of Heterocyclic Chemistry*, vol. 13, page. 337-348 0(1976).). The reaction can also be conducted in the absence of solvents, however, and without adding any catalysts, obtaining a quantitatively high yield (approximately 99%) at room temperature with a reaction time of approximately 6 hours.

The compound of formula (IV) is thus heated to a temperature in the range of 170° to 190° C. for a time in the range of 40 to 60 min, obtaining the compound of formula (V)

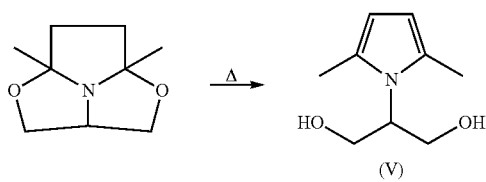

In particular, the compound of formula (V), 2-(2,5-dimethyl-1H-pyrrol-1-yl)-1,3-propanediol, hereinafter called serinol pyrrole (SP), is obtained by isomerizing the compound of formula (IV) by heating, then isolated by distilling under low pressure, obtaining a total yield of the synthesis of approximately 85%.

The serinol pyrrole (SP) synthesized as described above is then used to prepare the polymers according to the present invention.

Other serinol pyrroles variously substituted on either the pyrrole ring or the hydroxyl groups according to the general formula (IV)

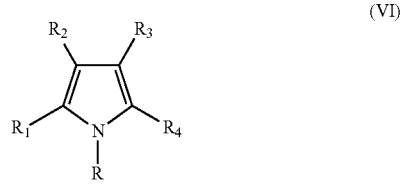

wherein $R_1$, $R_2$, $R_3$, $R_4$ are independently selected from the group consisting of: hydrogen, $C_1$-$C_{22}$ alkyl, linear or branched $C_2$-$C_{22}$ alkenyl or alkynyl, aryl, $C_1$-$C_{22}$ alkyl-aryl, linear or branched $C_2$-$C_{22}$ alkenyl-aryl, $C_2$-$C_{22}$ alkynyl-aryl, heteroaryl, and R is

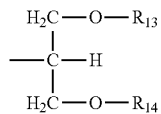

wherein R13 and R14 are independently selected from the group consisting of: hydrogen, $C_1$-$C_{22}$ alkyl, linear or branched $C_2$-$C_{22}$ alkenyl or alkynyl, aryl, linear or branched $C_2$-$C_{22}$ alkyl-aryl, linear or branched $C_2$-$C_{22}$ alkenyl-aryl, linear or branched $C_2$-$C_{22}$ alkynyl-aryl, heteroaryl;
or

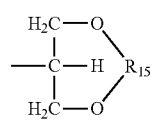

wherein R15 is independently selected from the group consisting of: a saturated or unsaturated, linear or branched hydrocarbon chain $C_1$-$C_3$, carbonyl group;
can be obtained by means of a reaction as described above starting from the reactive groups or substituted in the positions of interest.

The polymers according to the present invention are obtained by means of two different types of polymer synthesis, i.e. polymerizations in steps on hydroxyl groups of SP, and chain polymerizations on the pyrrole ring.

Polymerizations in Steps

Poly-additions or polycondensations can be obtained by means of the polymerization in steps on hydroxyl groups of SP.

The polymerization takes place between molecules possessing at least two reactive functional groups. In general terms, at least two molecules of different type, A and B—i.e. two molecules containing functional groups of different type, A and B, wherein each of these molecules contains at least 2 functional groups—are mixed together. The molecule A contains functional groups that can react with the functional groups of the molecule B. One or more molecules of type A and one or more molecules of type B may be used. For instance, the molecule A may contain at least two isocyanate groups and the molecule B may contain at least two hydroxyl groups. Their reaction will thus form urethane bonds and, since every molecule contains at least 2 functional groups, this will lead to the formation of a poly (urethane). To give another example, the molecule A may contain at least 2 carboxylic acids and the molecule B may contain at least two hydroxyl groups, so that their reaction will form ester bonds and, since every molecule contains at least 2 functional groups, this will lead to the formation of a poly(ester).

This type of polymerization can be conducted both in the presence and in the absence of a solvent, both in the presence and in the absence of a catalyst, depending on the types of functional group characterizing the molecules A and B.

According to the present invention, the polymers obtained by means of polymerizations in steps are preferably polyurethanes, polyethers, polycarbonate, polyesters.

Polyurethanes:

Polyurethanes are polymers in which a new functional group, carbamate or urethane, is generated that serves as the hub of the repeating unit of the polymer. The terminals of the polymer will be alcohol (—OH) or isocyanate (—N═C═O), or mixed. One or other terminal is obtained depending on the reaction conditions: in any case, the polymerization is conducted in equimolar quantities and, in this case, a urethane polymer with a mixed terminal will be obtained; if an excess of diol is added in a second stage, the polymer will have alcohol terminals, whereas the isocyanate bis terminal will be obtained with an excess of diisocyanate. Carbamate is generated by adding an alcoholic function to an isocyanate. The reaction can be seen as the addition of an oxygenated nucleophile to a carbonyl derivative. No secondary products are formed during the synthesis of polyurethanes; they are addition polymerizations.

According to the known state of the art, polyurethanes are generally synthesized in the presence of solvents, such as dimethyl formamide, using catalysts, tertiary aliphatic amines such as triethanolamine or diazabicyclo[2.2.2]octane, in conditions in which the temperature ranges from 25 to 110° C., and under ambient air pressure.

A general diagram of urethane polymerization is shown below:

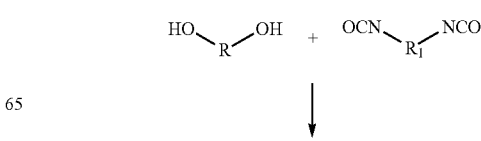

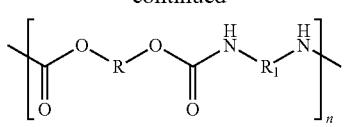

Polyethers:

For the synthesis of polyethers, first the hydroxyl is converted into a functional group capable of reacting with the functional group of the other type, which is an alkylic halide. The hydroxyl group is thus converted into an alcoxide that, under nucleophile attack, substitutes the halogen of the alkylic dihalide. The reaction is a classic Williamson's reaction [Boyd, Robert W.; Morrison, Robert (1992). *Organic Chemistry*. Englewood Cliffs, N.J.: Prentice Hall. pp. 241-242]. The oxygen of the alcoxide attacks the primary carbon of the dihalide, inducing the release of the halide, which salifies with the counterion of the alcoxide. The reaction proceeds well if it is conducted with primary dihalides.

The synthesis can be conducted in the presence of: alcoholic solvents such as isopropanol and tert-butanol; ethers such as methyl terbutyl ether; and amides such as dimethyl formamide.

The presence of strong bases such as potassium hydroxide or sodium hydride is essential. The temperatures are in the range of 25° C. to 130° C.

A general diagram of ether polymerization is shown below:

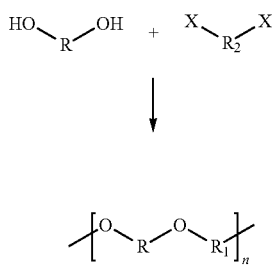

Polycarbonates:

Polycarbonates are polymers formed by the reaction of a diol with a molecule capable of generating a carbonate. The reaction is generally conducted between a diol and a dialkylic carbonate. The reaction is a transesterification: the oxygen of the diol attacks the carbonyl of the carbonate, giving rise to the formation of an intermediate carbonyl addition compound. The nucleophilic acyl substitution proceeds by means of the expulsion of the alcoholate. If the reaction is conducted between a dial and the diethyl carbonate, the diolic OH attack will lead to the formation of ethanol as a byproduct of the reaction.

Polycarbonate can be synthesized in the absence of solvents, or in the presence of organic solvents such as tetrahydrofuran and diethyl carbonate. Bases such as triethylamine, pyridine, and dimethylamine pyridine may be used as catalysts. The polymerization temperatures range between room temperature and 150° C.

A general diagram of carbonate polymerization is shown below:

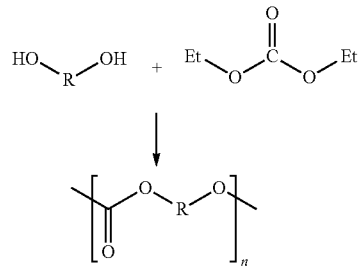

Polyesters:

Polyester is a polymer in which the ester group (—COOR) is contained in the repeating unit. The polymerization reaction involves a diol reacting with a carboxylic diacid, or a diester, or an acyl dihalide. In the first case, the reaction is conducted in catalytic acid conditions (Fisher's esterification [Emil Fischer, Arthur Speier (1895). "Darstellung der Ester". *Chetnische Berichte* 28: 3252-3258]), or by using a high temperature that enables the water due to condensation to be removed. In fact, the esterification reaction is a reaction of equilibrium. Removing one product, such as water, shifts the balance towards the products. The reaction between the diol and the diester proceeds by means of a transesterification mechanism in which the alcohol of the diol attacks the carbonyl of the diester, giving rise to the formation of a more stable ester and producing alcohols as a byproduct. If, on the other hand, the reaction involves the use of the diol and the acyl dihalide, the oxygen of the diol attacks the carbonyl of the acyl and leads to the formation of hydrohaloic acids that need to be neutralized by amines.

The reactions can be conducted in the presence of organic solvents such as dichloromethane, chloroform, or tetrahydrofuran. The reaction temperatures vary depending on the reactivity of the acyl dihalide or diester with which the diol is made to react; generally speaking it is in the range of 0° C. to 150° C.

Polyester reactions can be conducted in the absence of solvents, at higher temperatures than the melting point of the poly(ester) being formed, and removing the condensation water, thereby facilitating the displacement of the equilibrium towards the poly(ester) product.

A general diagram of the polymerization of polyesters is shown below:

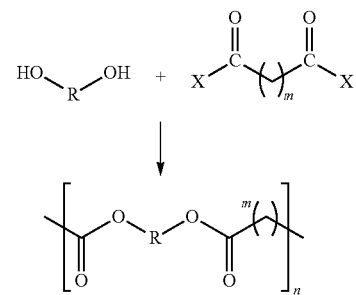

X = halogens

Chain Polymerization

Pyrrole can be polymerized by means of a poly-addition process that occurs in a chain mechanism.

Poly(pyrrole) is obtained by pyrrole oxidation. Substances that promote the polymerization reaction include: $Fe^{III}$ chloride (in methanol), potassium persulfate in the presence of tetramethylene ethylene diamine in a water-based solvent. Active substances may also be used, such as inorganic protic acids and Lewis acids.

Positions 2 and 5 on the pyrrole ring, i.e. in alpha in relation to the nitrogen, are the most reactive and consequently the positions on which the polymerization reaction takes place.

Pyrrole polymerization reactions can therefore demand a catalyst (e.g. iron chloride) or a substance used in stoichiometric quantities (potassium persulfate). The reactions can be conducted in water or in alcohols such as methanol, at ambient pressure, in normal laboratory equipment.

A general diagram of pyrrole polymerization by poly-addition is shown below.

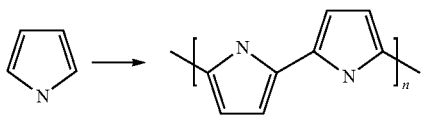

The adduct between the carbon nanotube and the polymer containing the pyrrole ring can be prepared by means of normal laboratory procedures. For instance, the polymer can be dissolved in an appropriate solvent, preferably with a low environmental impact, and preferably chosen from among the alcohols, ethers, ketones, esters, amides, and water. The carbon-based nanofiller can be dispersed in the same solvent, obtaining a fine dispersion, i.e. a small dimension of the carbon-based nanofiller aggregates (preferably, but not necessarily, near or below 100 nm), also with the contribution of energy from systems such as ultrasound generators.

The dispersion of the carbon-based nanofiller and the polymer solution containing the pyrrole ring are placed in contact and mixed, also with the contribution of energy from systems such as ultrasound generators.

The final dispersion can then be used for various purposes, as in the preparation of dispersions for use in coatings, or in mixtures with polymer matrices, preferably by separating the adduct from the dispersion.

Several examples of the preparation of the polymer, and of the polymer and carbon allotrope adduct according to the present invention are described below.

The polymer according to the present invention will be better elucidated by means of the examples given below, which illustrate the operating stages in the process for preparing the polymer, and its use with carbon allotropes.

Characteristics and advantages will be more readily apparent from the description of preferred, but not exclusive, embodiments of the present invention, given as examples in the attached drawings, wherein.

EXAMPLES

Examples 1-9: Synthesis of the Polymer

Example 1

Figure 1:
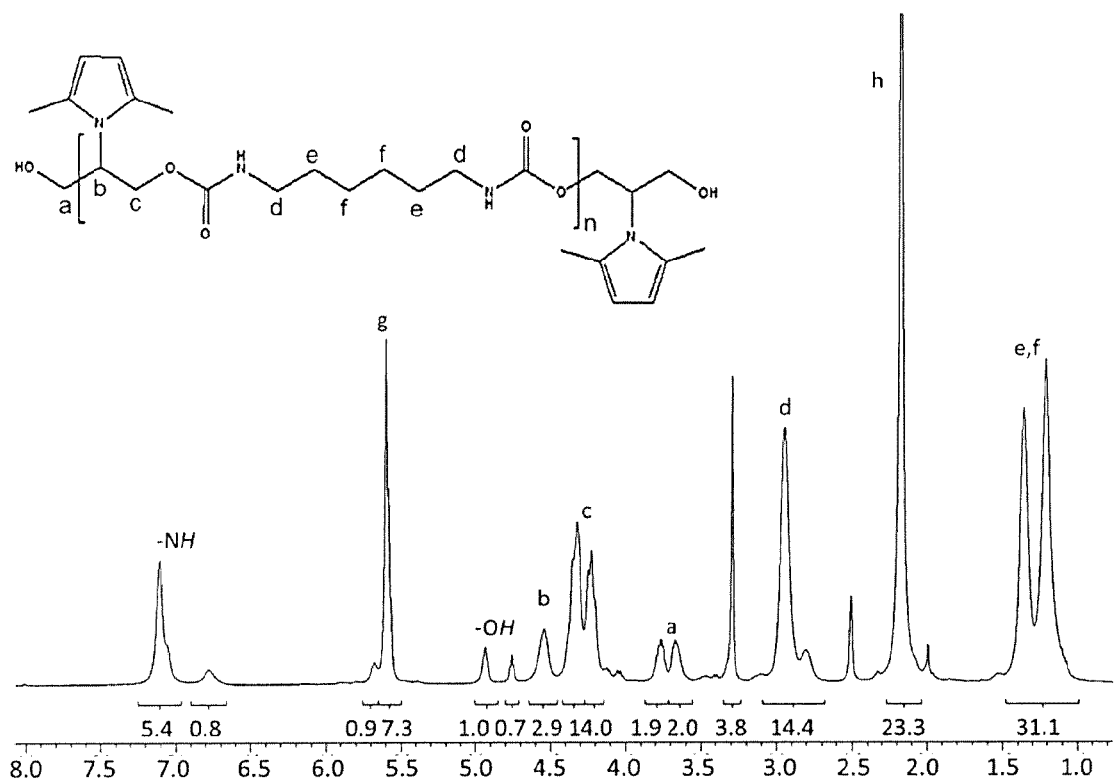
FIG. 1 is the $^1$H-NMR 400 MHz in DMSO-d6 spectrum of the polymer as in example 3.

High T Polyurethane Synthesis 2-(2,5-dimethyl-1H-pyrrol-1-yl)-1,3-propanediol (0.500 g, 2.96 mmol) and hexamethylene diisocyanate (0.498 g, 2.96 mmol) are mixed in a 50 mL two-neck flask fitted with a magnetic agitator and kept in a nitrogen atmosphere. The system is brought up to a temperature of 90° C. and agitated for 150 min. After this time has elapsed, the mixture is cooled to 25° C. and immediately solubilized in dichloromethane (3 mL). The polymer is purified by washing with diethyl ether (3×25 mL), filtered through a Buchner funnel and the traces of solvent are removed under a low pressure with the aid of a vacuum pump. 750 mg of polymer are isolated.

Example 2

Low T Polyurethane Synthesis 2-(2,5-dimethyl-1H-pyrrol-1-yl)-1,3-propanediol (0.500 g, 2.96 mmol) and hexamethylene diisocyanate (0.498 g, 2.96 mmol) are mixed in a 50 mL two-neck flask fitted with a magnetic agitator and kept in a nitrogen atmosphere. The system is maintained at 45° C. for 150 min. After this time has elapsed, the polymer obtained is solubilized in dichloromethane (3 mL). The polymer is then purified by washing with diethyl ether (3×25 mL), filtered through a Buchner funnel and the traces of solvent are removed under a low pressure with the aid of a vacuum pump. 420 mg of polymer are isolated.

Example 3

Synthesis of Polyurethanes with OH Terminals

Example 3 is conducted in the same way as Example 1, except that the reaction between 0.500 g of 2-(2,5-dimethyl-1H-pyrrol-1-yl)-1,3-propanediol and 0.498 g of hexamethylene diisocyanate is conducted for 120 min. After this time has elapsed, another 0.500 g of 2-(2,5-dimethyl-1H-pyrrol-1-yl)-1,3-propanediol are added. The system is then agitated for another 60 minutes. 600 mg of polymer are isolated.

The polymer thus obtained was analyzed by nuclear magnetic resonance (NMR) imaging. The one-dimensional spectra $^1$H- and $^{13}$C-NMR at 400 and 100.6 MHz, respectively, were recorded using a Bruker AV 400 equipped with a 5 mm multinuclear probe (reverse detection) (Bruker, Rheinstetten, Germany). The solvents used were deuterated: chloroform, dimethyl sulfur oxides, dimethyl sulfoxide. The temperature of the experiments was 27° C.

Figure 2:
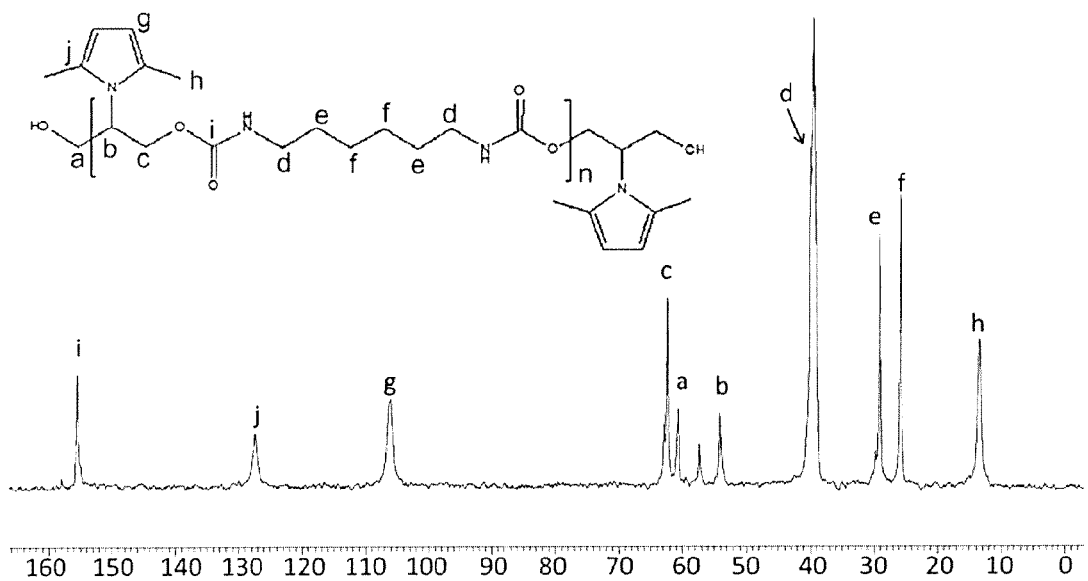
FIG. 2 is the C13-NMR in DMSO-d6 spectrum of the polymer as in example 3.

FIG. 1 and FIG. 2 respectively show the NMR spectra of the polyurethane, 1H and 13C.

Example 4

Synthesis of Polyurethanes with —NCO Terminals

Example 4 is conducted in the same way as Example 3, with the difference that, after the first 120 min of reaction, 0.500 g of hexamethylene diisocyanate are added instead of 0.550 g of diol. After adding the second aliquot of isocyanate, the system is agitated for another 60 minutes. 670 mg of polymer are isolated.

The polymer thus obtained was analyzed by (NMR) imaging. The one-dimensional spectra $^1$H- and $^{13}$C-NMR, at 400 and 100.6 MHz, respectively, were recorded using a Bruker AV 400 equipped with a 5 mm multinuclear probe (reverse detection) (Bruker, Rheinstetten, Germany). The solvents used were deuterated: chloroform, dimethyl sulfoxide. The temperature of the experiments was 27° C.

Figure 3:
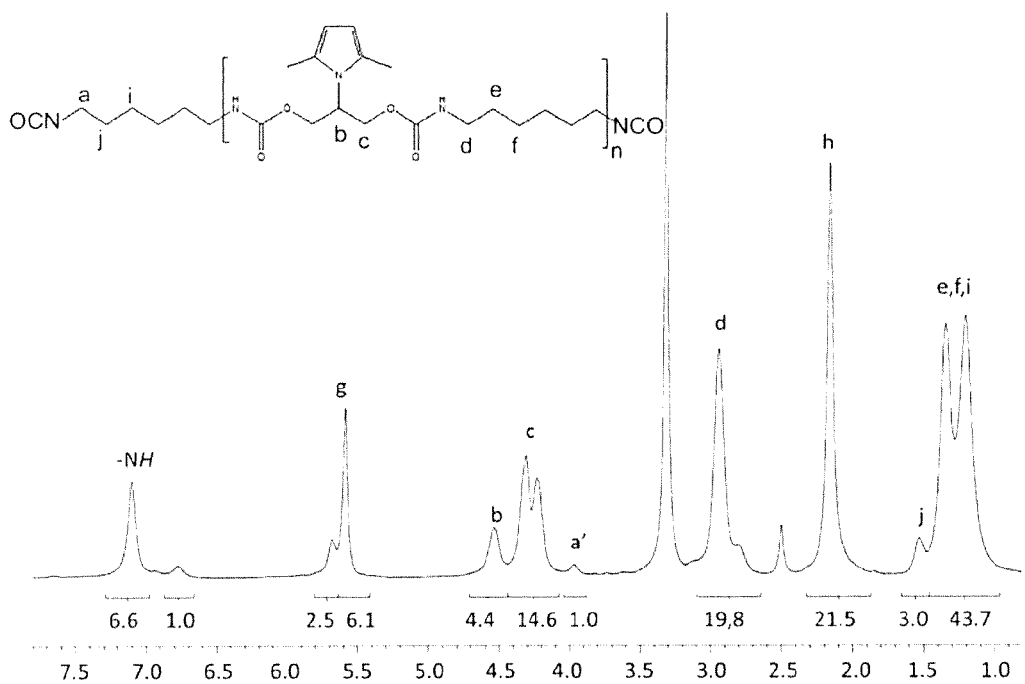
FIG. 3 is the $^1$H-NMR 400 MHz in DMSO-d6 spectrum of the polymer as in example 4.
Figure 4:
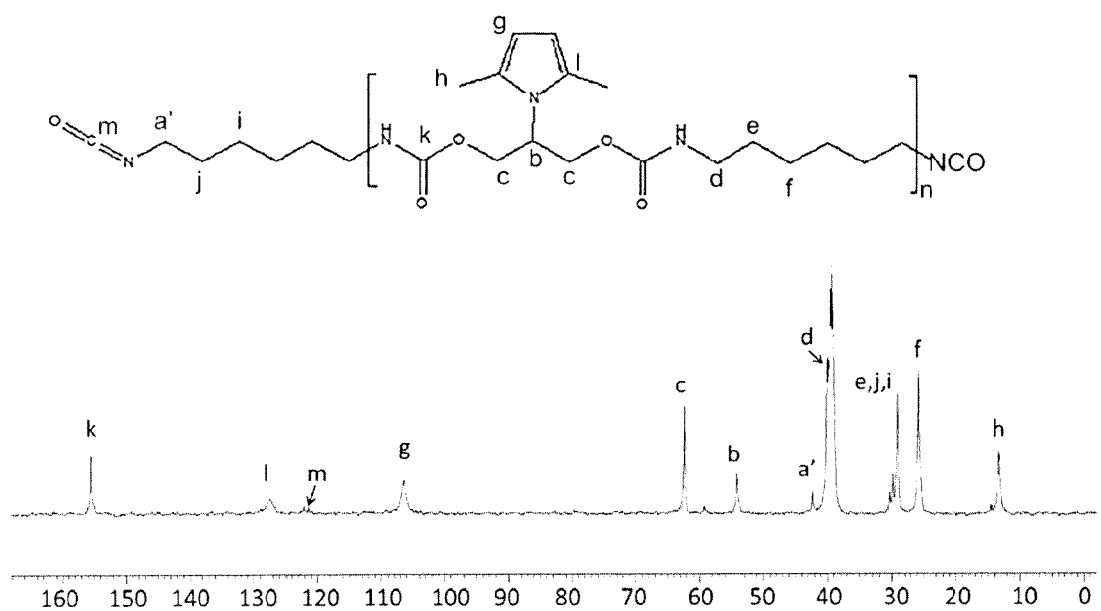
FIG. 4 is the C13-NMR in DMSO-d6 spectrum of the polymer as in example 4.

FIG. 3 and FIG. 4 show the NMR spectra of the polyurethanes 1H and 13C, respectively.

Example 5

Polyether Synthesis (Method A)

2-(2,5-dimethyl-1H-pyrrol-1-yl)-1,3-propanediol (0.500 g, 2.95 mmol) and anhydrous potassium hydroxide (0.500 g, 5.90 mmol) are added one after the other to a 25 mL single-neck flask at room temperature. After 30 min, 1,6-dibromohexane (0.545 mL) is added and the mixture is first sonicated for 30 min, then heated to 130° C. for 60 min. After this time has elapsed, the mixture is first cooled to room temperature, then water (10 mL) is added and then extracted with ethical acetate three times. The organic phases are pooled together and anhydrified on sodium sulfate, then dried under a low pressure. The residue is resolubilized in dichloromethane (2 mL) and added in an excess of hexane. 510 mg of polymer are isolated.

Example 6

Polyether Synthesis (Method B)

2-(2,5-dimethyl-1H-pyrrol-1-yl)-1,3-propanediol (0.500 g, 2.95 mmol) is solubilized in isopropanol (10 mL) in a 25 mL flask and anhydrous potassium hydroxide (0.500 g, 5.90 mmol) is added at room temperature. After 30 min, 1,6-dibromohexane (0.545 mL) is added and the mixture is first sonicated for 30 min, then heated to 90° C. for 60 min. After this time has elapsed, the solvent is removed under a low pressure with the aid of a rotary evaporator. The residue is resolubilized in dichloromethane (10 mL), washed with a saturated solution of magnesium chloride (15 mL), anhydrified on sodium sulfate and dried. 500 mg of polymer are isolated.

Example 7

Polyether Synthesis (Method C)

2-(2,5-dimethyl-1H-pyrrol-1-yl)-1,3-propanediol (0.500 g, 2.95 mmol) and anhydrous potassium hydroxide (0.500 g, 5.90 mmol) are added one after the other to a 25 mL single-neck flask at room temperature. After 30 min, 1,6-dibromoesano (0.545 mL) is added and the mixture is irradiated with microwaves for 30 min at 130° C. After this time has elapsed, water (10 mL) is added and the mixture is extracted three times with ethyl acetate. The organic phases are pooled together, anhydrified on sodium sulfate, and dried under a low pressure. The residue is resolubilized in dichloromethane (2 mL) and added in an excess of hexane. 600 mg of polymer are isolated.

Example 8

Polyester Synthesis

A solution of 2-(2,5-dimethyl-1H-pyrrol-1-yl)-1,3-propanediol (0.500 g, 2.95 mmol) in chloromethane (10 mL) is placed in a 25 mL single-neck flask and the following are added one after the other: first adipoyle chloride (0.540 g, 2.95 mmol), then triethylamine (0.820 mL) at 0° C., in an inert atmosphere. After 20 min, the mixture is warmed to room temperature and agitated for 5 hours. After this time has elapsed, distilled water (5 mL) is slowly added and the mixture is dried under a low pressure. The residue is resolubilized in dichloromethane (10 mL), repeatedly washed with a saturated solution of NaCl (3×15 mL), anhydrified on sodium sulfate and concentrated under a low pressure. 570 mg of polymer are isolated.

Example 9

Polycarbonate Synthesis

The following are placed one after the other in a 100 mL flask fitted with a Claisen condenser and a thermometer, and maintained in a nitrogen atmosphere: 2-(2,5-dimethyl-1H-pyrrol-1-yl)-1,3-propanediolo (0.500 g, 2.95 mmol), diethyl carbonate (0.349 g, 2.95 mmol) and 1,5,7-triazabicyclo[4.4.0]-dec-5-ene (2 mg, 0.5% mol). The mixture is agitated for 60 min at 80° C. After this time has elapsed, the system is connected to a vacuum pomp and left at 90° C. for 3 hours. The reaction mixture is cooled to room temperature, then water (10 mL) is added. The water is extracted by means of three successive washes performed with 10 mL of ethyl acetate. The organic phases are pooled together, anhydrified on sodium sulfate and dried under a low pressure.

Example 10

Monomer Synthesis for Polypyrrole

The monomer used is 2-(1H-pyrrol-1-yl)-1,3-diethyl propan diether.

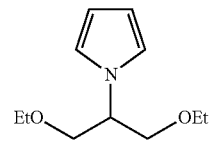 [SMILES: CCOCC(COCC)n1cccc1]

This monomer is a yellow oil.

1.4534 g of 2-(1H-pyrrol-1-yl)-1,3-propanediol (0.0103 mol) and 2.7128 g of finely-powdered KOH (0.0484 mol) are mixed in a single-neck flask fitted with a magnetic agitator, then 4 ml of ethyl iodide (7.8 g, 0.0500 mol) and 2 ml of THF are added to the reaction mixture. The reaction mixture is agitated for a weekend at room temperature. After this time has elapsed, the crude reaction product is a white precipitate and a yellow solution. In TLC, using AcOEt/hexane 7:3 as the eluent, the starting product is completely converted into the end product. The solution containing the bisubstituted product is separated from the solid by filtering and dried. The derivative obtained is isolated as a yellow oil with an 85% yield.

Polypyrrole Synthesis 0.6 ml of $H_2O$, 0.0600 g of 2-(1H-pyrrol-1-yl)-1.3-diethyl propan diether (0.000304 mol), 0.0090 g of $AgNO_3$ (0.000053 mol) and 0.1154 g of $K_2S_2O_8$ (0.000679 mol) are mixed in the above order in a single-neck flask fitted with a magnetic agitator at room temperature. The resulting biphasic solution is agitated overnight, after which it reveals a yellow supernatant and a black, viscous precipitate. After the stated time has elapsed, the two phases of the reaction mixture are separated by decanting. The dark tarry precipitate is dried with a mechanical pump for 3 hours at room temperature. In TLC, using an AcOEt/MeOH, 95:5 eluent mixture, the precipitate reveals the disappearance of the starting compound Rf=0.55 (not detectable on UV-vis spectroscopy) and the presence of a stain with Rf=0 (UV-vis, λ=254 nm and 366 nm).

Examples 11-13: Preparation of the Polymer and Carbon Allotrope Adduct 1

Example 11

Adduct consisting of polyurethane and carbon nanotube (CNT). Single-walled or multiwalled carbon nanotubes are used. The multiwalled carbon nanotubes (MWCNT) used are the NC7000 series by NANOCYL™ Inc. They are used as received from the supplier. The multiwalled carbon nanotubes (MWCNT) have a mean diameter from 3 to 20 nm, they are between 20 nm and 10 micron long, and the number of walls varies between 2 and 20. The carbon nanotubes are sonicated in acetone (1 mg/mL) in an ultrasound bath (2 L, power 260 W) for 15 min. Before any separation occurs, a solution of the polyurethane obtained in Example 1 in acetone is added to the unstable suspension. The resulting suspension is further sonicated for another 15 min and a stable suspension is obtained. The stability of the suspension was tested by checking for the absence of separation after centrifugation (5000 rpm, 5 minutes), using an ALC-Centrifugette 4206, and after storing the suspension at room temperature with no further agitation for 7 months. The suspensions were stored in glass laboratory vials with a capacity of 5 mL at a concentration of 1 mg/mL; 3 mg of CNT/PU were placed in a vial and 3 mL of solvent were added.

Example 12

Adduct consisting of polyether and carbon nanotubes (CNT). Single-walled or multiwalled carbon nanotubes are used. The multiwalled carbon nanotubes (MWCNT) used are the NC7000 series by NANOCYL™ Inc. They are used as received from the supplier. The multiwalled carbon nanotubes (MWCNT) have a mean diameter from 3 to 20 nm, they are between 20 nm and 10 micron long, and the number of walls varies between 2 and 20.

The carbon nanotubes are sonicated in ethyl acetate (1 mg/mL) in an ultrasound for 15 minutes. Before any separation occurs, a solution of the polyurethane obtained in Example 5 in ethyl acetate is added to the unstable suspension. The resulting suspension is further sonicated for another 15 min and a stable suspension is obtained. The stability of the suspension was tested by checking for the absence of separation after centrifugation (5000 rpm, 5 minutes), using an ALC-Centrifugette 4206, and after storing the suspension at room temperature with no further agitation for 3 months. The suspensions were stored in glass laboratory vials with a capacity of 5 mL at a concentration of 1 mg/mL; 3 mg of CNT/PU were placed in a vial and 3 mL of solvent were added.

Example 13

Adduct Consisting of Polyether and nanoG.

The graphite used is Synthetic Graphite 8427, purchased from Asbury Graphite Mills Inc., with a minimum carbon content of 99.8% by weight and a surface area of 330 $m^2/g$. It is characterized by approximately 35 overlapping layers of crystalline aggregate, as reported in "Chemically Reduced Graphite Oxide with Improved Shape Anisotropy" *J. Phys. Chem.* C 116 (2012) 24809-24813. It has nanometric dimensions and is known as nanographite (nanoG).

nanoG is sonicated in ethyl acetate (1 mg/mL) in an ultrasound bath for 30 min. A solution of the polyether prepared in Example 5 in ethyl acetate is added to the unstable suspension thus prepared before any separation occurs. The resulting suspension is further sonicated for 30 min and a stable suspension is obtained. The stability of the suspension was tested by checking for the absence of separation after centrifugation (5000 rpm, 5 minutes), using an ALC-Centrifugette 4206, and after storing the suspension at room temperature with no further agitation for 2 months. The suspensions were stored in glass laboratory vials with a capacity of 5 mL at a concentration of 1 mg/mL; 3 mg of NanoG/polyether were placed in each vial and 3 mL of solvent were added.

Examples 14-15: Stability Assessment on the Compound According to the Invention, and Example for Comparison

Example 14

The suspension of Example 10 is dried, obtaining the CNT/polyurethane compound (Compound 14.A).

The powdered CNT/polyurethane compound (100 mg) is placed in a 50 mL round-bottom flask fitted with a magnetic agitator. Then ethyl acetate (25 mL) is added. The resulting mixture is agitated overnight at room temperature. After this time has elapsed, the mixture is centrifuged at 5000 rpm for 30 min. The supernatant solvent is removed. The residual powder is dried under a low pressure, obtaining the Compound 14.B. The Compound A and the Compound B undergo thermogravimetric analysis, conducted with a Mettler TGA SDTA/851 according to the standard method in ISO 9924-1. The samples are heated under a flow of $N_2$ (at a flow rate of 60 ml/min) from 30° C. to 300° C. at a rate of 10° C. per minute, then maintained at 300° C. for 10 min, then heated from 300° C. to 550° C. at a rate of 20° C. per minute and maintained at 550° C. for 15 min. Then they are heated from 550° C. to 650° C. at a rate of 30° C. per minute and maintained at 650° C. for 20 min. Then they are maintained at <650° C. for a further 20 min in a flow of air (flow rate 60 ml/min): a 1% reduction is found in the weight of the compound attributable to the polyurethane.

Example 15

Example for Comparison 2,2-dimethylpropanediol (0.403 g, 3.87 mmol) and hexamethylene diisocyanate (0.650 g, 3.87 mmol) are mixed in a 50 mL two-neck flask fitted with a magnetic agitator and kept in a nitrogen atmosphere. The system is brought up to a temperature of 50° C. and agitated for 150 min. After this time has elapsed, another 0.403 g of 2,2-dimethylpropanediol are added. The system is then agitated for a further 60 min. 500 mg of polymer are isolated.

The CNT/polyurethane adduct is generated with the polyurethane thus obtained: the carbon nanotubes are sonicated in acetone (1 mg/mL) by means of an ultrasound bath for 15 min. Before any separation occurs, a solution of the polyurethane obtained in acetone is added to the unstable suspension. The resulting suspension is further sonicated for 15 min. An unstable suspension is obtained from which the solvent is removed under a low pressure, obtaining a powder that constitutes Compound 15A.

This Compound 15A (100 mg) is placed in a round bottom flask (50 mL) fitted with a magnetic agitator. Then ethyl acetate (25 mL) is added. The resulting mixture is agitated overnight at room temperature. After this time has elapsed, the mixture is centrifuged at 5000 rpm for 30 min. The supernatant solvent is removed. The residual powder is dried under low pressure, obtaining the Compound 15B. The Compound A and the Compound B undergo thermogravimetric analysis, conducted with a Mettler TGA SDTA/851 according to the standard method in ISO 9924-1. The samples are heated under a flow of $N_2$ (at a flow rate of 60 ml/min) from 30° C. to 300° C. at a rate of 10° C. per minute, then maintained at 300° C. for 10 min, then heated from 300° C. to 550° C. at a rate of 20° C. per minute and maintained at 550° C. for 15 min. Then they are heated from 550° C. to 650° C. at a rate of 30° C. per minute and maintained at 650° C. for 20 min. Then they are maintained at <650° C. for a further 20 min in a flow of air (flow rate 60 ml/min): a 23% reduction is found in the weight of the compound attributable to the polyurethane.

The invention claimed is:

1. Adduct of a polymer comprising repeating units of formula (I),

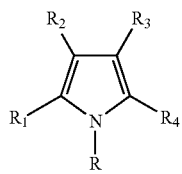

wherein if R1, R2, R3, R4 are independently selected from the group consisting of: hydrogen, C1-C22 alkyl, alkenyl or alkynyl, C2-C22 linear or branched alkyl, aryl, C1-C22 alkyl-aryl, alkenyl-aryl, C2-C22 linear or branched C2-C22 alkynyl-aryl, heteroaryl;

then R is independently selected from the group consisting of:

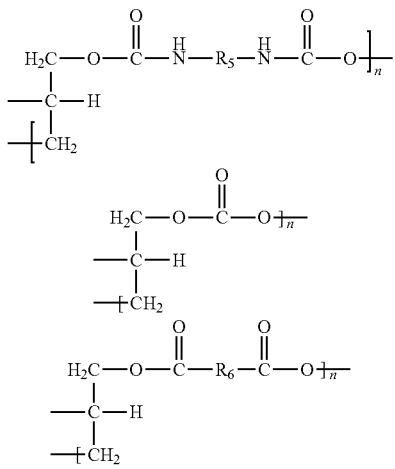

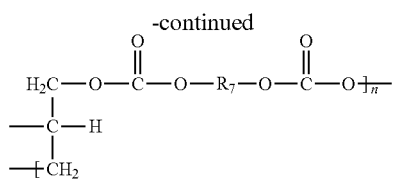

wherein R5, R6, R7 are selected from the group consisting of: saturated or unsaturated linear or branched C1-C22 hydrocarbon chain, unsubstituted or substituted C5-C6 cyclic hydrocarbon chain, aromatic group with no heteroatoms unsubstituted or substituted by one or more linear or branched C1-C22 hydrocarbon chains, aromatic group containing from 1 to 3 heteroatoms unsubstituted or substituted by one or more saturated or unsaturated linear or branched C1-C22 hydrocarbon chains, or R6 is equal to zero;

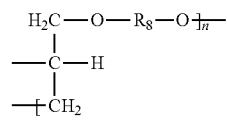

wherein R8 is selected from: linear or branched saturated or unsaturated C1-C22 hydrocarbon chain, unsubstituted or substituted C5-C6 cyclic hydrocarbon chain, aromatic group without heteroatoms or substituted by one or more linear or branched saturated or unsaturated C1-C22 hydrocarbon chains, aromatic group containing heteroatoms in number from 1 to 3 unsubstituted or substituted by one or more linear or branched saturated or unsaturated C1-C22 hydrocarbon chains, or compounds of formula

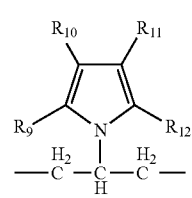

wherein R9, R10, R11, R12 are independently selected from the group consisting of: hydrogen, C1-C22 alkyl or linear or branched C2-C22 alkenyl or alkynyl, aryl, linear or branched C2-C22 alkyl-aryl, linear or branched C2-C22 alkenyl-aryl, linear or branched C2-C22 alkynyl-aryl, heteroaryl n is an integer from 1 to 1000;

if R is

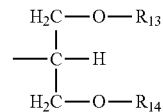

wherein R13 and R14 are independently selected from the group consisting of: hydrogen, C1-C22 alkyl, linear or branched C2-C22 alkenyl or alkynyl, aryl, linear or branched C2-C22 alkyl-aryl, linear or branched C2-C22 alkenyl-aryl, linear or branched C2-C22 alkynyl-aryl, heteroaryl;
or

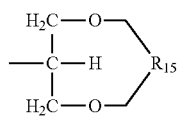

wherein R15 is independently selected from the group consisting of: a saturated or unsaturated, linear or branched C1-C3 hydrocarbon chain, a carbonyl group;
then R1 and R4 are

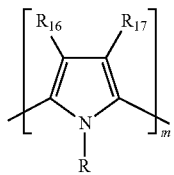

wherein R16, R17 are independently selected from the group consisting of: hydrogen, C1-C3 alkyl, linear or branched C2-C22 alkenyl or alkynyl, aryl, linear or branched C1-C22 alkyl-aryl, linear or branched C2-C22 alkenyl-aryl, linear or branched C2-C22 alkynyl-aryl, heteroaryl;
m is an integer from 1 to 1000;
and a carbon allotrope selected from the group consisting of carbon black, fullerene, single-wall or multiwall carbon nanotube, graphene, graphite with a number of graphene layers from 2 to 10000, graphite oxide, and graphene oxide.

2. Adduct according to claim 1, wherein in said polymer R is:

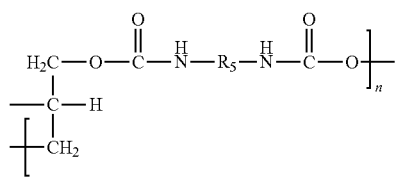

wherein R5 is selected from the group consisting of: saturated or unsaturated linear or branched C1-C22 hydrocarbon chain, unsubstituted or substituted C5-C6 cyclic hydrocarbon chain, aromatic group with no heteroatoms unsubstituted or substituted by one or more linear or branched C1-C22 hydrocarbon chains, aromatic group containing from 1 to 3 unsubstituted or substituted heteroatoms by one or more linear or branched saturated or unsaturated C1-C22 hydrocarbon chains,
and R1, R2, R3, R4 are independently selected from the group consisting of: hydrogen, C1-C22 alkyl, alkenyl or alkynyl, linear or branched C2-C22 alkyl, aryl, C1-C22 alkyl-aryl, alkenyl-aryl, linear or branched C2-C22 alkynyl-aryl, heteroaryl;
n is an integer from 1 to 1000.

3. Adduct according to claim 1, wherein in said polymer R is

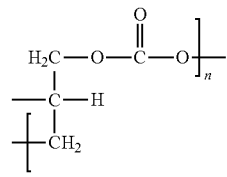

and R1, R2, R3, R4 are independently selected from the group consisting of: hydrogen, C1-C22 alkyl, alkenyl or alkynyl, linear or branched C2-C22 alkyl, aryl, C1-C22 alkyl-aryl, alkenyl-aryl, linear or branched C2-C22 alkynyl-aryl, heteroaryl;
n is an integer from 1 to 1000.

4. Adduct according to claim 1, wherein in said polymer R is

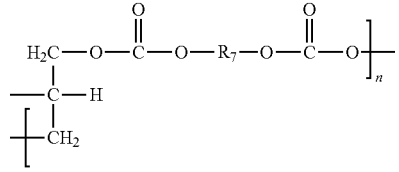

wherein R7 is selected from the group consisting of: saturated or unsaturated linear or branched C1-C22 hydrocarbon chain, unsubstituted or substituted C5-C6 cyclic hydrocarbon chain, aromatic group without heteroatoms unsubstituted or substituted by one or more linear or branched C1-C22 hydrocarbon chains, aromatic group containing from 1 to 3 unsubstituted or substituted heteroatoms by one or more saturated or unsaturated linear or branched C1-C22 hydrocarbon chains,
and R1, R2, R3, R4 are independently selected from the group consisting of: hydrogen, C1-C22 alkyl, alkenyl or alkynyl, linear or branched C2-C22 alkyl, aryl, C1-C22 alkyl-aryl, alkenyl-aryl, linear or branched C2-C22 alkynyl-aryl, heteroaryl,
n is an integer from 1 to 1000.

5. Adduct according to claim 1, wherein in said polymer R is

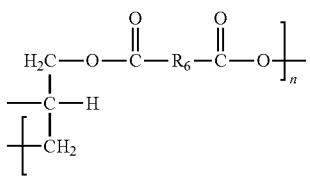

wherein R6 is selected from the group consisting of: saturated or unsaturated linear or branched C1-C22 hydrocarbon chain, unsubstituted or substituted C5-C6 cyclic hydrocarbon chain, aromatic group with no heteroatoms unsubstituted or substituted by one or more linear or branched C1-C22 hydrocarbon chains, aromatic group containing from 1 to 3 unsubstituted or substituted heteroatoms by one or more saturated or unsaturated linear or branched C1-C22 hydrocarbon chains, or R6 is equal to zero, and R1, R2, R3, R4 are independently selected from the group consisting of: hydrogen, C1-C22 alkyl, alkenyl or alkynyl, linear or branched C2-C22 alkyl, aryl, C1-C22 alkyl-aryl, alkenyl-aryl, linear or branched C2-C22 alkynyl-aryl, heteroaryl, n is an integer from 1 to 1000.

6. Adduct according to claim 1, wherein in said polymer R is

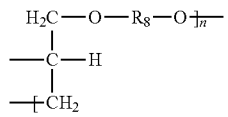

wherein R8 is selected from the group consisting of: saturated or unsaturated linear or branched C1-C22 hydrocarbon chain, unsubstituted or substituted C5-C6 cyclic hydrocarbon chain, aromatic group with no heteroatoms unsubstituted or substituted by one or more linear or branched C1-C22 hydrocarbon chains, aromatic group containing from 1 to 3 unsubstituted or substituted heteroatoms by one or more saturated or unsaturated linear or branched C1-C22 hydrocarbon chains, or compounds of formula (II)

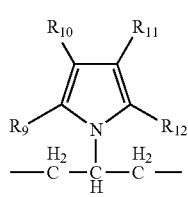

(II)

wherein R9, R10, R11, R12 are independently selected from the group consisting of: hydrogen, C1-C22 alkyl, alkenyl or alkynyl, linear or branched C2-C22 alkyl, aryl, C1-C22 alkyl-aryl, alkenyl-aryl, linear or branched C2-C22 alkynyl-aryl, heteroaryl, and R1, R2, R3, R4 are independently selected from the group consisting of: hydrogen, C1-C22 alkyl, alkenyl or alkynyl, linear or branched C2-C22 alkyl, aryl, C1-C22 alkyl-aryl, alkenyl-aryl, linear or branched C2-C22 alkynyl-aryl, heteroaryl;

n is an integer from 1 to 1000.

7. Adduct according to claim 1, wherein in said polymer R is

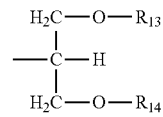

wherein R13 and R14 are independently selected from the group consisting of: hydrogen, C1-C22 alkyl, alkenyl or alkynyl, linear or branched C2-C22 alkyl, aryl, C1-C22 alkyl-aryl, alkenyl-aryl, linear or branched C2-C22 alkynyl-aryl, heteroaryl;

or

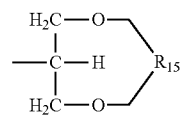

wherein R15 is independently selected from the group consisting of: saturated or unsaturated linear or branched C1-C3 hydrocarbon chain, carbonyl group; ed R1 e R4 sono

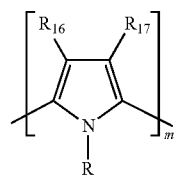

wherein R16, R17 are independently selected from the group consisting of: hydrogen, C1-C22 alkyl, alkenyl or alkynyl, linear or branched C2-C22 alkyl, aryl, C1-C22 alkyl-aryl, alkenyl-aryl, linear or branched C2-C22 alkynyl-aryl, heteroaryl;

m is an integer from 1 to 1000.

* * * * *